(12) United States Patent
Liu et al.

(10) Patent No.: US 9,496,941 B2
(45) Date of Patent: Nov. 15, 2016

(54) CODEBOOK FEEDBACK METHOD AND APPARATUS FOR MULTIPLE-ANTENNA CHANNEL IN MIMO SYSTEM

(71) Applicant: Alcatel Lucent, Boulogne Billancourt (FR)

(72) Inventors: Hao Liu, Shanghai (CN); Lu Wu, Shanghai (CN); Min Zhang, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/888,248

(22) PCT Filed: Mar. 18, 2014

(86) PCT No.: PCT/IB2014/000574
§ 371 (c)(1),
(2) Date: Oct. 30, 2015

(87) PCT Pub. No.: WO2014/177921
PCT Pub. Date: Nov. 6, 2014

(65) Prior Publication Data
US 2016/0065292 A1 Mar. 3, 2016

(51) Int. Cl.
*H04B 7/06* (2006.01)
*H04L 27/26* (2006.01)

(52) U.S. Cl.
CPC .......... *H04B 7/0639* (2013.01); *H04B 7/0617* (2013.01); *H04B 7/0626* (2013.01); *H04L 27/2636* (2013.01)

(58) Field of Classification Search
CPC H04B 7/0639; H04B 7/0626; H04B 7/0486; H04B 7/065; H04B 7/0417; H04B 7/0456; H04B 7/0452
See application file for complete search history.

(56) References Cited

U.S. PATENT DOCUMENTS

| 8,107,544 B2 | 1/2012 | Mondal et al. |
| 9,088,323 B2 * | 7/2015 | Park ..................... H04B 7/0486 |

(Continued)

FOREIGN PATENT DOCUMENTS

WO  WO 2012/015252 A2  2/2012

OTHER PUBLICATIONS

International Search Report for PCT/IB2014/000574 dated Sep. 12, 2014.

*Primary Examiner* — Vineeta Panwalkar
(74) *Attorney, Agent, or Firm* — Fay Sharpe, LLP

(57) ABSTRACT

A codebook feedback method and apparatus for a multiple-antenna channel in a Multiple Input Multiple Output (MIMO) system are provided. In an embodiment, a method (20) includes: detecting (21) a downlink multiple-antenna channel; determining (22) a first codeword in a first level codebook corresponding to the rank of R, where any codeword in the first level codebook is four diagonal matrices, two same 2×C block matrices exist on a diagonal line, and C column vectors of the 2×C block matrix are selected from $Q_1$ discrete Fourier transform (DFT) beam vectors; feeding back (23) an index of the first codeword; determining (24) a second codeword in a second level codebook corresponding to the rank of R, where any codeword in the second level codebook is a 2C×R matrix, each column of the 2C×R matrix is formed of one C×1 beam selection vector and one C×1 beam selection vector including phase offset information; and feeding back (25) an index of the second codeword. The foregoing solution introduces an orthogonal DFT beam selection in two-level codebook index feedback, and therefore becomes more suitable for an MIMO application of a cross-polarized configuration of four downlink transmit antennas.

15 Claims, 2 Drawing Sheets

(56) References Cited

U.S. PATENT DOCUMENTS

| | | | |
|---|---|---|---|
| 2011/0075752 A1* | 3/2011 | Zheng | H04B 7/0626 375/267 |
| 2012/0219042 A1 | 8/2012 | Onggosanusi et al. | |
| 2013/0114655 A1* | 5/2013 | Gomadam | H04L 1/0031 375/219 |
| 2013/0129014 A1 | 5/2013 | Kim et al. | |

* cited by examiner

CODEBOOK FEEDBACK METHOD AND APPARATUS FOR MULTIPLE-ANTENNA CHANNEL IN MIMO SYSTEM

BACKGROUND OF THE INVENTION

1. Field of the Invention

The present invention generally relates to the technology of mobile communications, and more specifically to a multiple user multiple input multiple output (MU MIMO) transmission technology.

2. Description of the Prior Art

In a Long Term Evolution (LTE) Release 10 (R10) system, when a base station, that is, an evolved NodeB (eNB) adopts a setting of a 4-antenna cross-polarized antenna array, because the Release 10 codebook is not precise enough for such a setting of antennas, the effect of downlink MU MIMO is not as desirable as expected, which severely limits MU MIMO applications.

SUMMARY OF THE INVENTION

One major objective is to provide a new technical solution for a codebook feedback in a MU-MIMO system and to overcome the foregoing defect in the prior art.

An embodiment provides a method of feedback for a 4-antenna downlink channel in a Multiple Input Multiple Output (MIMO) system, which includes: detecting a downlink multiple-antenna channel; determining a first codeword in a first level codebook corresponding to the rank of R according to a long-term broadband channel characteristic estimated from a result of the detection, where any codeword in the first level codebook is four diagonal matrices, two same 2×C block matrices exist on a diagonal line, and C column vectors of the 2×C block matrix are selected from $Q_1$ discrete Fourier transform (DFT) beam vectors; feeding back an index of the first codeword; determining a second codeword in a second level codebook corresponding to the rank of R according to a short-term channel characteristic estimated from the result of the detection and the first codeword, where any codeword in the second level codebook is a 2C×R matrix, and each column of the 2C×R matrix is formed of one C×1 beam selection vector and one C×1 beam selection vector including phase offset information; and feeding back an index of the second codeword.

An embodiment of the foregoing method further includes: determining a rank of downlink transmission.

Another embodiment provides an apparatus of feedback for a 4-antenna downlink channel in a MIMO system, which includes: a detection module, configured to detect a downlink multiple-antenna channel; a first determination module, configured to determine a first codeword in a first level codebook corresponding to the rank of R according to a long-term broadband channel characteristic estimated from a result of the detection, where any codeword in the first level codebook is four diagonal matrices, two same 2×C block matrices exist on a diagonal line, and C column vectors of the 2×C block matrix are selected from $Q_1$ DFT beam vectors; a feedback module, configured to feed back an index of the first codeword; and a second determination module, configured to determine a second codeword in a second level codebook corresponding to the rank of R according to a short-term channel characteristic estimated from the result of the detection and the first codeword, where any codeword in the second level codebook is a 2C×R matrix, and each column of the 2C×R matrix is formed of one C×1 beam selection vector and one C×1 beam selection vector including phase offset information; where the feedback module is further configured to feed back an index of the second codeword.

An embodiment of the foregoing apparatus further includes a third determination module, configured to determine a rank of downlink transmission.

An embodiment provides a user equipment, which includes the foregoing apparatus.

Yet another embodiment provides a method for use in a base station having 4 transmit antennas in a MIMO system, which includes: receiving a rank of downlink transmission, an index of a first codeword in a first level codebook, and an index of a second codeword in a second level codebook fed back by a user equipment, where any codeword in the first level codebook is four diagonal matrices, two same 2×C block matrices exist on a diagonal line, C column vectors of the 2×C block matrix are selected from $Q_1$ DFT beam vectors, any codeword in the second level codebook is a 2C×R matrix, and each column of the 2C×R matrix is formed of one C×1 beam selection vector and one C×1 beam selection vector including phase offset information; and determining a downlink channel characteristic according to the rank, the index of the first codeword, and the index of the second codeword.

A further embodiment provides an apparatus for use in a base station having 4 transmit antennas in a MIMO system, which includes: a receiving module, configured to receive a rank of downlink transmission, an index of a first codeword in a first level codebook, and an index of a second codeword in a second level codebook fed back by a user equipment, where any codeword in the first level codebook is four diagonal matrices, two same 2×C block matrices exist on a diagonal line, C column vectors of the 2×C block matrix are selected from $Q_1$ DFT beam vectors, any codeword in the second level codebook is a 2C×R matrix, and each column of the 2C×R matrix is formed of one C×1 beam selection vector and one C×1 beam selection vector including phase offset information; and a channel characteristic determination module, configured to determine a downlink channel characteristic according to the rank, the index of the first codeword, and the index of the second codeword.

An embodiment provides base station equipment, which includes the foregoing apparatus.

In some embodiments of the methods, apparatuses, and equipment, a column vector of a codeword in the first level codebook includes DFT beam vectors with an equal stride and DFT beam vectors orthogonal to each other, or includes DFT beam vectors with an equal stride but no DFT beam vectors orthogonal to each other.

In some other embodiments of the foregoing methods, apparatuses, and equipment, corresponding to the rank of 1, a column vector of any codeword in the second level codebook is configured as selecting a same or different DFT beam independently for each polarization, or configured as selecting a same DFT beam for each polarization.

In yet some other embodiments of the foregoing methods, apparatuses, and equipment, corresponding to the rank of 2, a column vector of any codeword in the second level codebook is configured as selecting a same or different DFT beam independently for each polarization and selecting a same DFT beam for each layer, or configured as selecting a same or different DFT beam for each layer independently and selecting a same DFT beam for each polarization, or configured as selecting a same or different DFT beam independently for each polarization and selecting a same or different DFT beam for each layer independently, or configured as selecting a same DFT beam for each polarization and selecting a same DFT beam for each layer.

In some further embodiments of the foregoing methods, apparatuses, and equipment, a first level codebook corresponding to the rank of 3 or 4 is a proper subset of a first level codebook corresponding to the rank of 1 or 2.

In still some embodiments of the foregoing methods, apparatuses, and equipment, corresponding to the rank of 3 or 4, a column vector of the 2×C block matrix includes DFT beam vectors orthogonal to each other, and a column vector of any codeword in the second level codebook is configured as selecting a same or different DFT beam independently for each polarization, or configured as selecting a same DFT beam for each polarization.

The foregoing technical solutions introduce orthogonal DFT beam selection in two-level codebook index feedback, and therefore become more suitable for an MIMO application of a cross-polarized configuration of four downlink transmit antennas.

The technical features and advantages of the present invention are illustrated in brief above to make the following detailed illustration of the present invention more comprehensible. Other features and advantages of the present invention are described in the following, which constitute the subject of the claims of the present invention. A person skilled in the art shall understand that the disclosed concept and embodiments may be easily used as a basis for modifying or designing other structures or processes for implementing an objective same as that of the present invention. A person skilled in the art further should understand that such an equivalent structure does not depart from the spirit and scope of the appended claims.

BRIEF DESCRIPTION OF THE DRAWINGS

With reference to the accompanying drawings, the following detailed illustration of the preferred embodiments pertaining to the present invention becomes more comprehensible. The present invention is illustrated exemplarily rather than to be limited by the accompanying drawings, and similar reference numerals in the accompanying drawings represent similar components.

DETAILED DESCRIPTION

The detailed illustration of the accompanying drawings is intended to be the illustration of current preferred embodiments of the present invention, rather than to indicate a sole form to implement the present invention. It should be understood that the same or equivalent functions can be accomplished by different embodiments that shall fall within the spirit and scope of the present invention.

A person skilled in the art shall understand that means and functions described here may be implemented by using software functions that combines a program-control microprocessor and a general-purpose computer, and/or implemented by using an application-specific integrated circuit (ASIC). It should be further understood that although the present invention is mainly illustrated in the forms of a method and an apparatus, the present invention may also be implemented as a computer program product and a system including a computer processor and a memory connected to the processor, where the memory is encoded by one or more programs that accomplish the functions disclosed herein.

Figure 1:
FIG. 1 shows an application scenario according to an embodiment of the present invention.

FIG. 1 is a schematic view of an application scenario according to an embodiment of the present invention. The technical solution of the present invention is suitable for a MIMO system. As shown in FIG. 1, the scenario includes a base station equipment 1 and a user equipment 2. The technical solution of the present invention is suitable for, for example, without any limitation, feedback of a precoding matrix index (PMI) between the base station equipment 1 and the user equipment 2. A person skilled in the art shall understand that the base station or the base station equipment stated herein is, for example, but is not limited to, a NodeB or an evolved NodeB (eNB) in an LTE system or an LTE-A system. The technical solution of the present invention is also not limited to an applicable LTE system or LTE-A system. The index feedback here adopts a two-level codebook solution, and a complete codeword W corresponds to a downlink channel characteristic, which may be represented by the formula $W=W_1*W_2$. The first codeword $W_1$ is taken from a first level codebook $B_1$ and is configured to indicate a long-term broadband channel characteristic. The second codeword $W_2$ is taken from a second level codebook $B_1$ and is configured to indicate a short-term channel characteristic. As the second codeword is obtained through channel detection on several corresponding sub-bands according to a service demand of a user equipment, which is also often configured to indicate a channel characteristic of several corresponding sub-bands. The first codeword may be fed back by a long period, whereas the second codeword may be fed back by a short period.

Figure 2:
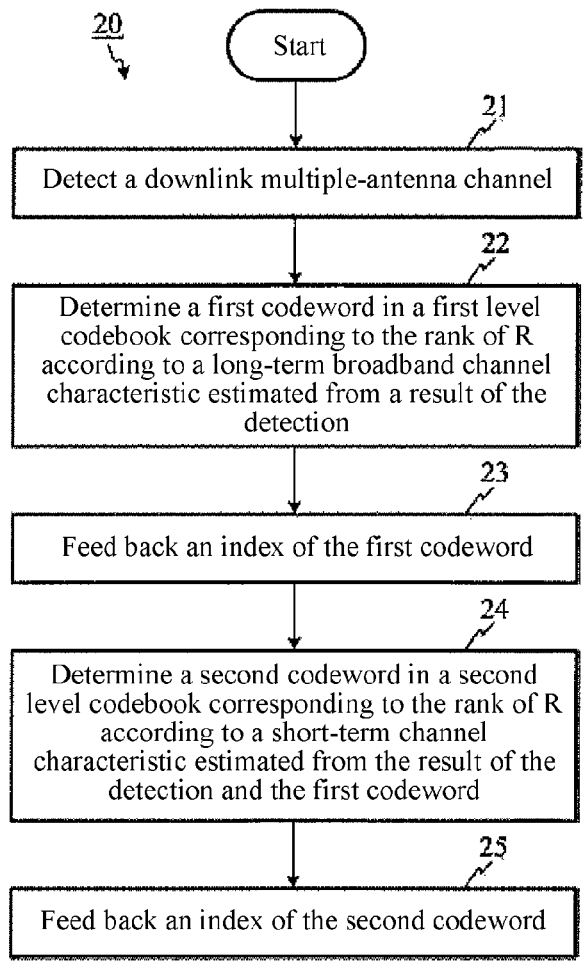
FIG. 2 is a flow chart of a method suitable for feedback for a 4-antenna downlink channel in a MIMO system according to an embodiment of the present invention.

FIG. 2 is a flow chart of a method suitable for feedback for a 4-antenna downlink channel in a MIMO system according to an embodiment of the present invention. As shown in FIG. 2, a method 20 includes Steps 21, 22, 23, 24, and 25 execute by the user equipment 2.

In Step 21, the user equipment 2 detects a downlink multiple-antenna channel. For example, without any limitation, multiple antennas of the downlink multiple-antenna channel detected by the user equipment 2 are all transmit antennas of the base station equipment 1.

In Step 22, the user equipment 2 determines a first codeword in a first level codebook corresponding to the rank of R according to a long-term broadband channel characteristic estimated from a result of the detection, where any codeword in the first level codebook is four diagonal matrices, two same 2×C block matrices exist on a diagonal line, and C column vectors of the 2×C block matrix are selected from $Q_1$ DFT beam vectors.

In Step 23, the user equipment 2 feeds back an index of the first codeword.

In Step 24, the user equipment 2 determines a second codeword in a second level codebook corresponding to the rank of R according to a short-term channel characteristic estimated from the result of the detection and the first codeword, where any codeword in the second level codebook is a 2C×R matrix, and each column of the 2C×R matrix is formed of one C×1 beam selection vector and one C×1 beam selection vector including phase offset information.

In Step 25, the user equipment 2 feeds back an index of the second codeword.

In some cases, the foregoing method 20 further includes Step 26, the user equipment 2 determines a rank R of downlink transmission. In an environment of 4 downlink transmit antennas, R may be 1, 2, 3 or 4. Step 26 is usually executed before Step 22.

Figure 3:
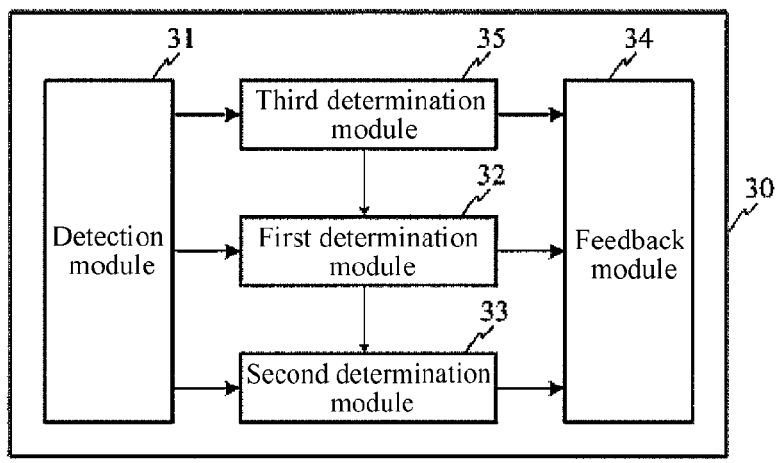
FIG. 3 is a schematic structural view of an apparatus suitable for feedback for a 4-antenna downlink channel in a MIMO system according to an embodiment of the present invention.

FIG. 3 is a schematic structural view of an apparatus 30 suitable for feedback for a 4-antenna downlink channel in a MIMO system according to an embodiment of the present invention. As shown in FIG. 3, the apparatus 30 includes a detection module 31, a first determination module 32, a second determination module 33, and a feedback module 34. The apparatus 30 is usually configured in the user equipment 2.

The detection module 31 is configured to detect a downlink multiple-antenna channel.

The first determination module 32 is configured to determine a first codeword in a first level codebook corresponding to the rank of R according to a long-term broadband channel characteristic estimated from a result of the detection, where any codeword in the first level codebook is four diagonal matrices, two same 2×C block matrices exist on a diagonal line, and C column vectors of the 2×C block matrix are selected from $Q_1$ DFT beam vectors.

The feedback module 34 is configured to feed back an index of the first codeword.

The second determination module 33 is configured to determine a second codeword in a second level codebook corresponding to the rank of R according to a short-term channel characteristic estimated from the result of the detection and the first codeword, where any codeword in the second level codebook is a 2C×R matrix, and each column of the 2C×R matrix is formed of one C×1 beam selection vector and one C×1 beam selection vector including phase offset information.

The feedback module 34 is further configured to feed back an index of the second codeword.

In some cases, the foregoing apparatus 30 further includes a third determination module 35, configured to determine a rank R of downlink transmission. In an environment of 4 downlink transmit antennas, R may be 1, 2, 3 or 4. The rank R is usually determined before the first codeword and the second codeword are determined.

Figure 4:
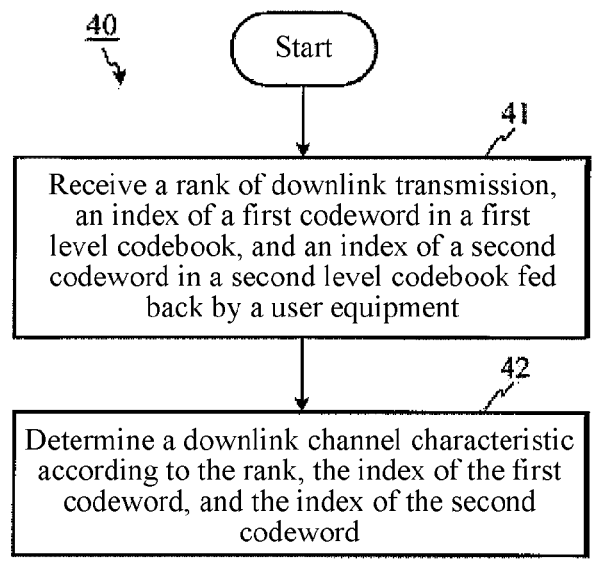
FIG. 4 is a flow chart of a method suitable for a base station having 4 transmit antennas in a MIMO system according to an embodiment of the present invention.

FIG. 4 is a flow chart of a method suitable for a base station having 4 transmit antennas in a MIMO system according to an embodiment of the present invention. As shown in FIG. 4, the method 40 includes steps 41 and 42 executed by the base station equipment 1.

In Step 41, the base station equipment 1 receives a rank of downlink transmission, an index of a first codeword in a first level codebook, and an index of a second codeword in a second level codebook fed back by a user equipment, where any codeword in the first level codebook is four diagonal matrices, two same 2×C block matrices exist on a diagonal line, C column vectors of the 2×C block matrix are selected from $Q_1$ DFT beam vectors, any codeword in the second level codebook is a 2C×R matrix, and each column of the 2C×R matrix is formed of one C×1 beam selection vector and one C×1 beam selection vector including phase offset information.

In Step 42, the base station equipment 1 determines a downlink channel characteristic according to the rank, the index of the first codeword, and the index of the second codeword.

Figure 5:
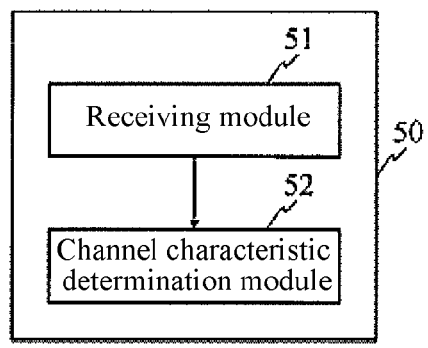
FIG. 5 is a schematic structural view of an apparatus suitable for a base station having 4 transmit antennas in a MIMO system according to an embodiment of the present invention.

FIG. 5 is a schematic structural view of an apparatus 50 suitable for a base station having 4 transmit antennas in a MIMO system according to an embodiment of the present invention. As shown in FIG. 5, the apparatus 50 includes a receiving module 51 and a channel characteristic determination module 52. The apparatus 50 is usually configured in the base station equipment 1.

The receiving module 51 is configured to receive a rank of downlink transmission, an index of a first codeword in a first level codebook, and an index of a second codeword in a second level codebook fed back by a user equipment, where any codeword in the first level codebook is four diagonal matrices, two same 2×C block matrices exist on a diagonal line, C column vectors of the 2×C block matrix are selected from $Q_1$ DFT beam vectors, any codeword in the second level codebook is a 2C×R matrix, and each column of the 2C×R matrix is formed of one C×1 beam selection vector and one C×1 beam selection vector including phase offset information.

The channel characteristic determination module 52 is configured to determine a downlink channel characteristic according to the rank, the index of the first codeword, and the index of the second codeword.

In some embodiments, codebooks with the rank of 1 and the rank of 2 adopt a same first level codebook $B_1$, where the total number $N_1$ of codewords in $B_1$ is 16, for which 4-bit encoding is adopted for index feedback. For the design of $B_1$, the following variables need to be considered, which include a size C of a beam set of each block matrix, a beam granularity $Q_1$, beam selection $(\alpha_{1,n}, \alpha_{2,n}, \ldots, \alpha_{C,n})$, and beam overlapping.

Several optional codebook solutions in consideration of different combinations are provided as follows:

In Embodiment 1.1, the size C of a beam set in a block matrix on a diagonal line in the first codeword $W_1$ is 4, the beam granularity $Q_1$ is 16, and the beam selection is set to be $(\alpha_{1,n}, \alpha_{2,n}, \alpha_{3,n}, \alpha_{4,n})=(n,n+1,n+8,n+9)$, where n is a value between 0 and 15. The beam set includes adjacent and orthogonal DFT beams. The beam gap between the adjacent beams is $2\pi/16$, and the gap between the orthogonal beams is $\pi$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 & 1 & 1 \\ e^{j\frac{2\pi}{16}n} & e^{j\frac{2\pi}{16}(n+1)} & e^{j\frac{2\pi}{16}(n+8)} & e^{j\frac{2\pi}{16}(n+9)} \end{bmatrix}.$$

Two DFT beams are overlapped in two adjacent codewords, and half of the codewords in $B_1$ are repetitive. Such a first level codebook is redundant.

In Embodiment 1.2, the size C of a beam set in a block matrix on a diagonal line in the first codeword $W_1$ is 4, the beam granularity $Q_1$ is 16, and the beam selection is set to be $(\alpha_{1,n}, \alpha_{2,n}, \alpha_{3,n}, \alpha_{4,n})=(n,n+1,n+2,n+3)$, where n is a value between 0 and 15. The beam set includes DFT beams with an equal stride, and the beam gap between adjacent beams is $2\pi/16$. Any codeword $W_1$ is represented as:

$$W_1 = \begin{bmatrix} X_n & 0 \\ 0 & X_n \end{bmatrix}, n \in \{0, 1, \ldots, 15\}$$

-continued $$X_n = \begin{bmatrix} 1 & 1 & 1 & 1 \\ e^{j\frac{2\pi}{16}n} & e^{j\frac{2\pi}{16}(n+1)} & e^{j\frac{2\pi}{16}(n+2)} & e^{j\frac{2\pi}{16}(n+3)} \end{bmatrix}.$$

Three DFT beams are overlapped in two adjacent codewords, and codewords in B1 are different from each other. Such a first level codebook is not redundant.

In Embodiment 1.3, the size C of a beam set in a block matrix on a diagonal line in the first codeword $W_1$ is 4, the beam granularity $Q_1$ is 32, and the beam selection is set to be $(\alpha_{1,n},\alpha_{2,n},\alpha_{3,n},\alpha_{4,n})=(n,n+1,n+16,n+17)$, where n is a value between 0 and 15. The beam set includes adjacent and orthogonal DFT beams. The beam gap between the adjacent beams is $2\pi/32$, and the gap between the orthogonal beams is $\pi$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 & 1 & 1 \\ e^{j\frac{2\pi}{32}n} & e^{j\frac{2\pi}{32}(n+1)} & e^{j\frac{2\pi}{32}(n+16)} & e^{j\frac{2\pi}{32}(n+17)} \end{bmatrix}.$$

Two DFT beams are overlapped in two adjacent codewords, and codewords in B1 are different from each other. Such a first level codebook is not redundant.

In Embodiment 1.4, the size C of a beam set in a block matrix on a diagonal line in the first codeword $W_1$ is 4, the beam granularity $Q_1$ is 32, and the beam selection is set to be $(\alpha_{1,n},\alpha_{2,n},\alpha_{3,n},\alpha_{4,n})=(2n,2n+1,2n+16,2n+17)$, where n is a value between 0 and 15. The beam set includes adjacent and orthogonal DFT beams. The beam gap between the adjacent beams is $2\pi/32$, and the gap between the orthogonal beams is $\pi$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 & 1 & 1 \\ e^{j\frac{2\pi}{32}2n} & e^{j\frac{2\pi}{32}(2n+1)} & e^{j\frac{2\pi}{32}(2n+16)} & e^{j\frac{2\pi}{32}(2n+17)} \end{bmatrix}.$$

No DFT beam is overlapped in two adjacent codewords, and half of the codewords in $B_1$ are repetitive. Such a first level codebook is redundant.

In Embodiment 1.5, the size C of a beam set in a block matrix on a diagonal line in the first codeword $W_1$ is 4, the beam granularity $Q_1$ is 32, and the beam selection is set to be $(\alpha_{1,n},\alpha_{2,n},\alpha_{3,n},\alpha_{4,n})=(2n,2n+1,2n+2,2n+3)$, where n is a value between 0 and 15. The beam set includes DFT beams with an equal stride. The beam gap between the adjacent beams is $2\pi/32$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 & 1 & 1 \\ e^{j\frac{2\pi}{32}2n} & e^{j\frac{2\pi}{32}(2n+1)} & e^{j\frac{2\pi}{32}(2n+2)} & e^{j\frac{2\pi}{32}(2n+3)} \end{bmatrix}.$$

Two DFT beams are overlapped in two adjacent codewords, and codewords in B1 are different from each other. Such a first level codebook is not redundant.

In Embodiment 1.6, the size C of a beam set in a block matrix on a diagonal line in the first codeword $W_1$ is 2, the beam granularity $Q_1$ is 16, and the beam selection is set to be $(\alpha_{1,n},\alpha_{2,n})=(n,n+1)$, where n is a value between 0 and 15. The beam set includes 2 adjacent DFT beams, the beam gap between which is $2\pi/16$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 \\ e^{j\frac{2\pi}{16}n} & e^{j\frac{2\pi}{16}(n+1)} \end{bmatrix}.$$

Only one DFT beam is overlapped in two adjacent codewords, and codewords in B1 are different from each other. Such a first level codebook is not redundant.

In Embodiment 1.7, the size C of a beam set in a block matrix on a diagonal line in the first codeword $W_1$ is 2, the beam granularity $Q_1$ is 32, and the beam selection is set to be $(\alpha_{1,n},\alpha_{2,n})=(n,n+16)$, where n is a value between 0 and 15. The beam set includes orthogonal DFT beams, and the beam gap is $\pi$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 \\ e^{j\frac{2\pi}{32}n} & e^{j\frac{2\pi}{32}(n+16)} \end{bmatrix}.$$

No DFT beam is overlapped in each codeword, and codewords in $B_1$ are different from each other. Such a first level codebook is not redundant.

In Embodiment 1.8, the size C of a beam set in a block matrix on a diagonal line in the first codeword $W_1$ is 2, the beam granularity $Q_1$ is 16, and the beam selection is set to be $(\alpha_{1,n},\alpha_{2,n})=(2n,2n+1)$, where n is a value between 0 and 15. The beam set includes adjacent DFT beams, and the beam gap is $2\pi/32$. Any codeword $W_1$ is represented as:

$$W_1 = \begin{bmatrix} X_n & 0 \\ 0 & X_n \end{bmatrix}, n \in \{0, 1, \ldots, 15\}$$

$$X_n = \begin{bmatrix} 1 & 1 \\ e^{j\frac{2\pi}{32}2} & e^{j\frac{2\pi}{32}(2n+1)} \end{bmatrix}.$$

No DFT beam is overlapped in each codeword, and codewords in $B_1$ are different from each other. Such a first level codebook is not redundant.

In other embodiments, the size C of a beam set in a block matrix on a diagonal line in the first codeword $W_1$ is 2 or 4, and the beam set includes a plurality of DFT beams with an equal stride or orthogonal to each other. The orthogonal beams has a fixed gap of $\pi$; when the beam granularity $Q_1$ is 32, the gap between the DFT beams with an equal stride may be $2m\pi/32$ (where m is a random value between 1 and 15), and when the beam granularity $Q_1$ is 16, the gap may be $2m\pi/16$ (where m is a random value between 1 and 7).

For the second level codebook $B_2$ with the rank of 1 of the second codeword $W_2$, a beam selection method of a different polarization should be considered according to the structure of the first level codebook. Several solutions of a second level codebook with the rank of 1 are provided as follows:

In Embodiment 2.1, the size C of a beam set in a block matrix $X_n$ is 4, a same or different DFT beam is selected independently for each polarization, that is, $y_1$ and $y_2$ in any column of the codeword $W_2$ are either same or different, and such a second level codebook is suitable to match the first level codebook $B_1$ that is redundant. The number $N_2$ of codewords in a second level codebook corresponding to the rank of 1 is 16, and 4-bit is adopted for index feedback, where the beam selection and the phase offset information have four options, respectively, for which 4-bit is adopted for index feedback, respectively. Any codeword $W_2$ in the second level codebook $B_2$ is represented as:

$$W_2 = a_1 \in C_2 =$$
$$\left\{ \frac{1}{\sqrt{2}} \begin{bmatrix} y_1 \\ y_2 \end{bmatrix}, \frac{1}{\sqrt{2}} \begin{bmatrix} y_1 \\ jy_2 \end{bmatrix}, \frac{1}{\sqrt{2}} \begin{bmatrix} y_1 \\ -y_2 \end{bmatrix}, \frac{1}{\sqrt{2}} \begin{bmatrix} y_1 \\ -jy_2 \end{bmatrix} \right\} \begin{bmatrix} y_1 \\ y_2 \end{bmatrix} \in$$
$$\left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_3 \end{bmatrix}, \begin{bmatrix} \tilde{e}_2 \\ \tilde{e}_4 \end{bmatrix} \right\}.$$

In Embodiment 2.2, the size C of a beam set in the block matrix $X_n$ is 4, a same DFT beam is selected for each polarization, that is, $y_1$ and $y_2$ in any column of the second codeword $W_2$ are same, and such a second level codebook is suitable to match the first level codebook $B_1$ that is not redundant. The number $N_2$ of codewords in a second level codebook corresponding to the rank of 1 is 16, and 4-bit is adopted for index feedback, where the beam selection and the phase offset information have four options, respectively, for which 4-bit is adopted for index feedback, respectively. Any codeword $W_2$ in the second level codebook $B_2$ is represented as:

$$W_2 = a_1 \in C_2 =$$
$$\left\{ \frac{1}{\sqrt{2}} \begin{bmatrix} y_1 \\ y_2 \end{bmatrix}, \frac{1}{\sqrt{2}} \begin{bmatrix} y_1 \\ jy_2 \end{bmatrix}, \frac{1}{\sqrt{2}} \begin{bmatrix} y_1 \\ -y_2 \end{bmatrix}, \frac{1}{\sqrt{2}} \begin{bmatrix} y_1 \\ -jy_2 \end{bmatrix} \right\} \begin{bmatrix} y_1 \\ y_2 \end{bmatrix} \in$$
$$\left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_3 \\ \tilde{e}_3 \end{bmatrix}, \begin{bmatrix} \tilde{e}_4 \\ \tilde{e}_4 \end{bmatrix} \right\}.$$

In Embodiment 2.3, the size C of a beam set in a block matrix $X_n$ is 2, a same DFT beam is selected for each polarization, that is, $y_1$ and $y_2$ in any column of the second codeword $W_2$ are same, and such a second level codebook is suitable to match the first level codebook $B_1$ that is not redundant. The number $N_2$ of codewords in a second level codebook corresponding to the rank of 1 is 8, and 3-bit is adopted for index feedback, where the beam selection has two options for which 1-bit is adopted for index feedback, and the phase offset information has four options for which 2-bit is adopted for index feedback. Any codeword $W_2$ in the second level codebook $B_2$ is represented as:

$$W_2 = a_1 \in C_2 =$$
$$\left\{ \frac{1}{\sqrt{2}} \begin{bmatrix} y_1 \\ y_2 \end{bmatrix}, \frac{1}{\sqrt{2}} \begin{bmatrix} y_1 \\ jy_2 \end{bmatrix}, \frac{1}{\sqrt{2}} \begin{bmatrix} y_1 \\ -y_2 \end{bmatrix}, \frac{1}{\sqrt{2}} \begin{bmatrix} y_1 \\ -jy_2 \end{bmatrix} \right\} \begin{bmatrix} y_1 \\ y_2 \end{bmatrix} \in$$
$$\left\{ \begin{bmatrix} \tilde{e}_1 \\ \tilde{e}_1 \end{bmatrix}, \begin{bmatrix} \tilde{e}_2 \\ \tilde{e}_2 \end{bmatrix} \right\}.$$

In Embodiment 2.4, the size C of a beam set in a block matrix $X_n$ is 2, a same or different DFT beam is selected independently for each polarization, that is, $y_1$ and $y_2$ in any column of the codeword $W_2$ are either same or different. The number $N_2$ of codewords in a second level codebook corresponding to the rank of 1 is 16, and 4-bit is adopted for index feedback, where the beam selection and the phase offset information have four options, respectively, for which 4-bit is adopted for index feedback, respectively. Any codeword $W_2$ in the second level codebook $B_2$ is represented as:

$$W_2 = a_1 \in C_2 =$$
$$\left\{ \frac{1}{\sqrt{2}} \begin{bmatrix} y_1 \\ y_2 \end{bmatrix}, \frac{1}{\sqrt{2}} \begin{bmatrix} y_1 \\ jy_2 \end{bmatrix}, \frac{1}{\sqrt{2}} \begin{bmatrix} y_1 \\ -y_2 \end{bmatrix}, \frac{1}{\sqrt{2}} \begin{bmatrix} y_1 \\ -jy_2 \end{bmatrix} \right\} \begin{bmatrix} y_1 \\ y_2 \end{bmatrix} \in$$
$$\left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_2 \end{bmatrix}, \begin{bmatrix} \tilde{e}_2 \\ \tilde{e}_1 \end{bmatrix} \right\}.$$

For the second level codebook $B_2$ with the rank of 2 of the second codeword $W_2$, a beam selection method of a different polarization and a different layer should be considered according to the structure of the first level codebook. The solutions of the second level codebook with the rank of 2 are provided as follows:

In Embodiment 3.1, the size C of a beam set in the block matrix $X_n$ is 4, a same or different DFT beam is selected independently for each polarization, a DFT beam is selected for each layer, and such a second level codebook is suitable to match the first level codebook $B_1$ that is not redundant. The number $N_2$ of the codewords in the second level codebook corresponding to the rank of 2 is 16, and 4-bit is adopted for index feedback, where the beam selection has eight options, for which 3-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2} \begin{bmatrix} y_1 & y_1 \\ y_2 & -y_2 \end{bmatrix}, \frac{1}{2} \begin{bmatrix} y_1 & y_1 \\ jy_2 & -jy_2 \end{bmatrix} \right\}$$

$$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_3 \end{bmatrix}, \begin{bmatrix} \tilde{e}_2 \\ \tilde{e}_4 \end{bmatrix}, \begin{bmatrix} \tilde{e}_3 \\ \tilde{e}_3 \end{bmatrix}, \begin{bmatrix} \tilde{e}_4 \\ \tilde{e}_4 \end{bmatrix}, \begin{bmatrix} \tilde{e}_3 \\ \tilde{e}_1 \end{bmatrix}, \begin{bmatrix} \tilde{e}_4 \\ \tilde{e}_2 \end{bmatrix} \right\}.$$

In Embodiment 3.2, the size C of a beam set in a block matrix $X_n$ is 4, a same or different DFT beam is selected independently for each layer, a same DFT beam is selected for each polarization, and such a second level codebook is suitable to match the first level codebook $B_1$ that is not redundant. The number $N_2$ of the codewords in the second level codebook corresponding to the rank of 2 is 16, and 4-bit is adopted for index feedback, where the beam selection has eight options, for which 3-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2} \begin{bmatrix} y_1 & y_2 \\ y_1 & -y_2 \end{bmatrix}, \frac{1}{2} \begin{bmatrix} y_1 & y_2 \\ jy_1 & -jy_2 \end{bmatrix} \right\}$$

-continued $$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_3 \end{bmatrix}, \begin{bmatrix} \tilde{e}_2 \\ \tilde{e}_4 \end{bmatrix}, \begin{bmatrix} \tilde{e}_3 \\ \tilde{e}_3 \end{bmatrix}, \begin{bmatrix} \tilde{e}_4 \\ \tilde{e}_4 \end{bmatrix}, \begin{bmatrix} \tilde{e}_3 \\ \tilde{e}_1 \end{bmatrix}, \begin{bmatrix} \tilde{e}_4 \\ \tilde{e}_2 \end{bmatrix} \right\}.$$

In Embodiment 3.3, the size C of a beam set in a block matrix $X_n$ is 4, a same or different DFT beam is selected independently for each polarization and layer, such a second level codebook is suitable to match the first level codebook $B_1$ that is redundant, and the block matrix $X_n$ should include orthogonal DFT beams. The number $N_2$ of the codewords in the second level codebook corresponding to the rank of 2 is 16, and 4-bit is adopted for index feedback, where the beam selection has eight options, for which 3-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2}\begin{bmatrix} y_1 & y_3 \\ y_2 & -y_4 \end{bmatrix}, \frac{1}{2}\begin{bmatrix} y_1 & y_3 \\ jy_2 & -jy_4 \end{bmatrix} \right\}$$

$$\begin{bmatrix} y_1 & y_3 \\ y_2 & y_4 \end{bmatrix} \in \left\{ \begin{bmatrix} \tilde{e}_1 & \tilde{e}_1 \\ \tilde{e}_1 & \tilde{e}_1 \end{bmatrix}, \begin{bmatrix} \tilde{e}_2 & \tilde{e}_2 \\ \tilde{e}_2 & \tilde{e}_2 \end{bmatrix}, \begin{bmatrix} \tilde{e}_1 & \tilde{e}_1 \\ \tilde{e}_3 & \tilde{e}_3 \end{bmatrix}, \begin{bmatrix} \tilde{e}_2 & \tilde{e}_2 \\ \tilde{e}_4 & \tilde{e}_4 \end{bmatrix}, \begin{bmatrix} \tilde{e}_1 & \tilde{e}_3 \\ \tilde{e}_1 & \tilde{e}_3 \end{bmatrix}, \begin{bmatrix} \tilde{e}_2 & \tilde{e}_4 \\ \tilde{e}_2 & \tilde{e}_4 \end{bmatrix}, \begin{bmatrix} \tilde{e}_1 & \tilde{e}_3 \\ \tilde{e}_3 & \tilde{e}_1 \end{bmatrix}, \begin{bmatrix} \tilde{e}_2 & \tilde{e}_4 \\ \tilde{e}_4 & \tilde{e}_2 \end{bmatrix} \right\}.$$

In Embodiment 3.4, the size C of a beam set in a block matrix $X_n$ is 4, a same or different DFT beam is selected independently for each polarization, and a DFT beam is selected for each layer, and such a second level codebook is suitable to match the first level codebook $B_1$ that is redundant. The number $N_2$ of the codewords in the second level codebook corresponding to the rank of 2 is 8, and 3-bit is adopted for index feedback, where the beam selection has four options, for which 2-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2}\begin{bmatrix} y_1 & y_2 \\ y_1 & -y_2 \end{bmatrix}, \frac{1}{2}\begin{bmatrix} y_1 & y_2 \\ jy_1 & -jy_2 \end{bmatrix} \right\}$$

$$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_3 \end{bmatrix}, \begin{bmatrix} \tilde{e}_2 \\ \tilde{e}_4 \end{bmatrix} \right\}.$$

In Embodiment 3.5, the size C of a beam set in a block matrix $X_n$ is 4, a same or different DFT beam is selected independently for each layer, a same DFT beam is selected for each polarization, and such a second level codebook is suitable to match the first level codebook $B_1$ that is redundant. The number $N_2$ of the codewords in the second level codebook corresponding to the rank of 2 is 8, and 3-bit is adopted for index feedback, where the beam selection has four options, for which 2-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2}\begin{bmatrix} y_1 & y_2 \\ y_1 & -y_2 \end{bmatrix}, \frac{1}{2}\begin{bmatrix} y_1 & y_2 \\ jy_1 & -jy_2 \end{bmatrix} \right\}$$

-continued $$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_3 \end{bmatrix}, \begin{bmatrix} \tilde{e}_2 \\ \tilde{e}_4 \end{bmatrix} \right\}.$$

In Embodiment 3.6, the size C of a beam set in a block matrix $X_n$ is 4, a same DFT beam is selected for each polarization, a same DFT beam is selected for each layer, and such a second level codebook is suitable to match the first level codebook $B_1$ that is not redundant. The number $N_2$ of the codewords in the second level codebook corresponding to the rank of 2 is 8, and 3-bit is adopted for index feedback, where the beam selection has four options, for which 2-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2}\begin{bmatrix} y_1 & y_1 \\ y_2 & -y_2 \end{bmatrix}, \frac{1}{2}\begin{bmatrix} y_1 & y_1 \\ jy_2 & -jy_2 \end{bmatrix} \right\}$$

$$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_3 \\ \tilde{e}_3 \end{bmatrix}, \begin{bmatrix} \tilde{e}_4 \\ \tilde{e}_4 \end{bmatrix} \right\}.$$

In Embodiment 3.7, the size C of a beam set in a block matrix $X_n$ is 2, a same or different DFT beam is selected independently for each polarization, and a same or different DFT beam is selected independently for each layer, such a second level codebook is suitable to match the first level codebook $B_1$ that is not redundant, and the block matrix $X_n$ should include orthogonal DFT beams. The number $N_2$ of the codewords in the second level codebook corresponding to the rank of 2 is 16, and 4-bit is adopted for index feedback, where the beam selection has eight options, for which 3-bit is adopted for index feedback, and the phase offset information has two options, for which 1-bit is adopted for index feedback. Any codeword W in the second level codebook $B_2$ is represented as:

$$W_2 = [a_1, a_2] \in C_2 = \left\{ \frac{1}{2}\begin{bmatrix} y_1 & y_3 \\ y_2 & -y_4 \end{bmatrix}, \frac{1}{2}\begin{bmatrix} y_1 & y_3 \\ jy_2 & -jy_4 \end{bmatrix} \right\}$$

$$\begin{bmatrix} y_1 & y_3 \\ y_2 & y_4 \end{bmatrix} \in \left\{ \begin{bmatrix} \tilde{e}_1 & \tilde{e}_1 \\ \tilde{e}_1 & \tilde{e}_1 \end{bmatrix}, \begin{bmatrix} \tilde{e}_2 & \tilde{e}_2 \\ \tilde{e}_2 & \tilde{e}_2 \end{bmatrix}, \begin{bmatrix} \tilde{e}_1 & \tilde{e}_1 \\ \tilde{e}_2 & \tilde{e}_2 \end{bmatrix}, \begin{bmatrix} \tilde{e}_2 & \tilde{e}_2 \\ \tilde{e}_1 & \tilde{e}_1 \end{bmatrix}, \begin{bmatrix} \tilde{e}_1 & \tilde{e}_2 \\ \tilde{e}_1 & \tilde{e}_2 \end{bmatrix}, \begin{bmatrix} \tilde{e}_2 & \tilde{e}_1 \\ \tilde{e}_2 & \tilde{e}_1 \end{bmatrix}, \begin{bmatrix} \tilde{e}_1 & \tilde{e}_2 \\ \tilde{e}_2 & \tilde{e}_1 \end{bmatrix}, \begin{bmatrix} \tilde{e}_2 & \tilde{e}_1 \\ \tilde{e}_1 & \tilde{e}_2 \end{bmatrix} \right\}.$$

In Embodiment 3.8, the size C of a beam set in a block matrix $X_n$ is 2, a same or different DFT beam is selected independently for each polarization, and a same DFT beam is selected for each layer, and such a second level codebook is suitable to match the first level codebook $B_1$ that is not redundant. The number $N_2$ of the codewords in the second level codebook corresponding to the rank of 2 is 8, and 3-bit is adopted for index feedback, where the beam selection has four options, for which 2-bit is adopted for index feedback, and the phase offset information has two options, for which 1-bit is adopted for index feedback, Any codeword $W_2$ in the second level codebook $B_2$ is represented as:

$$W_2 = [a_1, a_2] \in C_2 = \left\{ \frac{1}{2}\begin{bmatrix} y_1 & y_1 \\ y_1 & -y_2 \end{bmatrix}, \frac{1}{2}\begin{bmatrix} y_1 & y_1 \\ jy_1 & -jy_2 \end{bmatrix} \right\}$$

-continued $$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_2 \end{bmatrix}, \begin{bmatrix} \tilde{e}_2 \\ \tilde{e}_1 \end{bmatrix} \right\}.$$

In Embodiment 3.9, the size C of a beam set in a block matrix $X_n$ is 2, a same or different DFT beam is selected independently for each layer, and a same DFT beam is selected for each polarization, and such a second level codebook is suitable to match the first level codebook $B_1$ that is not redundant. The number $N_2$ of the codewords in the second level codebook corresponding to the rank of 2 is 8, and 3-bit is adopted for index feedback, where the beam selection has four options, for which 2-bit is adopted for index feedback, and the phase offset information has two options, for which 1-bit is adopted for index feedback. Any codeword $W_2$ in the second level codebook $B_2$ is represented as:

$$W_2 = [a_1, a_2] \in C_2 = \left\{ \frac{1}{2} \begin{bmatrix} y_1 & y_2 \\ y_1 & -y_2 \end{bmatrix}, \frac{1}{2} \begin{bmatrix} y_1 & y_2 \\ jy_1 & -jy_2 \end{bmatrix} \right\}$$

$$\begin{bmatrix} y_1 \\ y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix}, \begin{bmatrix} \tilde{e}_1 \\ \tilde{e}_2 \end{bmatrix}, \begin{bmatrix} \tilde{e}_2 \\ \tilde{e}_1 \end{bmatrix} \right\}.$$

In some embodiments, codebooks with the rank of 3 and the rank of 4 adopt the same first level codebook $B_1$, and several optional codebook solutions are provided as follows:

In Embodiment 4.1, the first level codebook with the rank of 1 or the rank of 2 is still a suitable first level codebook with the rank of 3 or the rank of 4, which is not only suitable for the beam granularity $Q_1$ of 16, but also is suitable for the beam granularity $Q_1$ of 32. 4-bit is still adopted for index feedback.

In Embodiment 4.2, a suitable first level codebook with the rank of 3 or the rank of 4 is a subset selected from a suitable first level codebook with the rank of 1 or the rank of 2, for example, selected from the first level codebook in Embodiment 1.1. The size C of a beam set in a block matrix on a diagonal line in the first codeword $W_1$ is 4, the beam granularity $Q_1$ is 16, and the beam selection is set to be $(\alpha_{1,n},\alpha_{2,n}, \alpha_{3,n}, \alpha_{4,n})=(n,n+1,n+8,n+9)$, where n is a value among 0, 2, 4, and 6. The beam set includes adjacent and orthogonal DFT beams. The beam gap between the adjacent beams is $2\pi/16$, and the gap between the orthogonal beams is $\pi$. No DFT beam is overlapped, and the first level codebook is not redundant. Any codeword $W_1$ is represented as:

$$W_1 = \begin{bmatrix} X_n & 0 \\ 0 & X_n \end{bmatrix}, n \in \{0, 2, 4, 6\}$$

$$X_n = \begin{bmatrix} 1 & 1 & 1 & 1 \\ e^{j\frac{2\pi}{16}n} & e^{j\frac{2\pi}{16}(n+1)} & e^{j\frac{2\pi}{16}(n+8)} & e^{j\frac{2\pi}{16}(n+9)} \end{bmatrix}.$$

In Embodiment 4.3, a suitable first level codebook with the rank of 3 or the rank of 4 is a subset selected from a suitable first level codebook with the rank of 1 or the rank of 2, for example, selected from the first level codebook in Embodiment 1.2. The size C of a beam set in a block matrix on a diagonal line in the first codeword $W_1$ is 4, the beam granularity $Q_1$ is 16, and the beam selection is set to be $(\alpha_{1,n},\alpha_{2,n}, \alpha_{3,n}, \alpha_{4,n})=(n,n+1,n+2,n+3)$, and n is a value among 0, 4, 8, and 12. The beam set includes adjacent DFT beams, and the beam gap between adjacent beams is $2\pi/16$. No DFT beam is overlapped, and the first level codebook is not redundant. Any codeword $W_1$ is represented as:

$$W_1 = \begin{bmatrix} X_n & 0 \\ 0 & X_n \end{bmatrix}, n \in \{0, 4, 8, 12\}$$

$$X_n = \begin{bmatrix} 1 & 1 & 1 & 1 \\ e^{j\frac{2\pi}{16}n} & e^{j\frac{2\pi}{16}(n+1)} & e^{j\frac{2\pi}{16}(n+2)} & e^{j\frac{2\pi}{16}(n+3)} \end{bmatrix}.$$

In Embodiment 4.4, a suitable first level codebook with the rank of 3 or the rank of 4 is designed again and is different from the suitable first level codebook with the rank of 1 or the rank of 2. The size C of a beam set in a block matrix on a diagonal line in the first codeword $W_1$ is 4, the beam granularity $Q_1$ is 8, and the beam selection is set to be $(\alpha_{1,n},\alpha_{2,n}, \alpha_{3,n}, \alpha_{4,n})=(n,n+1,n+4,n+5)$, where n is a value between 0 and 3. The beam set includes adjacent and orthogonal DFT beams. The beam gap between the adjacent beams is $2\pi/8$, and the gap between the orthogonal beams is $7\pi$. Two DFT beams are overlapped in two adjacent codewords, and no repetitive codeword exists in $B_1$. Such a first level codebook is not redundant. Any codeword $W_1$ is represented as:

$$W_1 = \begin{bmatrix} X_n & 0 \\ 0 & X_n \end{bmatrix}, n \in \{0, 1, 2, 3\}$$

$$X_n = \begin{bmatrix} 1 & 1 & 1 & 1 \\ e^{j\frac{2\pi}{8}n} & e^{j\frac{2\pi}{8}(n+1)} & e^{j\frac{2\pi}{8}(n+4)} & e^{j\frac{2\pi}{8}(n+5)} \end{bmatrix}.$$

Embodiment 5.1 is a design corresponding to the second level codebook $B_2$ with the rank of 3. The size C of a beam set in a block matrix $X_n$ is 4, and a same or different DFT beam is selected independently for each polarization. The block matrix $X_n$ should include orthogonal DFT beams. The number $N_2$ of the codewords in the second level codebook is 16, and 4-bit is adopted for index feedback, where the beam selection has 16 options, for which 4-bit is adopted for feedback, and the phase offset information only has one option. Any codeword $W_2$ in the second level codebook $B_2$ is represented as:

$$W_2 = [a_1, a_2, a_3] \in C_2 = \left\{ \frac{1}{\sqrt{2}} \begin{bmatrix} y_1 & y_3 \\ y_2 & -y_4 \end{bmatrix} \right\}$$

$$\begin{bmatrix} y_1 & y_3 \\ y_2 & y_4 \end{bmatrix} \in \left\{ \begin{bmatrix} \tilde{e}_1 & [\tilde{e}_1 \ \tilde{e}_3] \\ \tilde{e}_1 & [\tilde{e}_1 \ \tilde{e}_3] \end{bmatrix}, \begin{bmatrix} \tilde{e}_2 & [\tilde{e}_2 \ \tilde{e}_4] \\ \tilde{e}_2 & [\tilde{e}_2 \ \tilde{e}_4] \end{bmatrix}, \\ \begin{bmatrix} \tilde{e}_3 & [\tilde{e}_1 \ \tilde{e}_3] \\ \tilde{e}_3 & [\tilde{e}_1 \ \tilde{e}_3] \end{bmatrix}, \begin{bmatrix} \tilde{e}_4 & [\tilde{e}_2 \ \tilde{e}_4] \\ \tilde{e}_4 & [\tilde{e}_2 \ \tilde{e}_4] \end{bmatrix}, \\ \begin{bmatrix} [\tilde{e}_1 \ \tilde{e}_3] & \tilde{e}_3 \\ [\tilde{e}_1 \ \tilde{e}_3] & \tilde{e}_3 \end{bmatrix}, \begin{bmatrix} [\tilde{e}_2 \ \tilde{e}_4] & \tilde{e}_4 \\ [\tilde{e}_2 \ \tilde{e}_4] & \tilde{e}_4 \end{bmatrix}, \\ \begin{bmatrix} [\tilde{e}_3 \ \tilde{e}_1] & \tilde{e}_1 \\ [\tilde{e}_3 \ \tilde{e}_1] & \tilde{e}_1 \end{bmatrix}, \begin{bmatrix} [\tilde{e}_4 \ \tilde{e}_2] & \tilde{e}_2 \\ [\tilde{e}_4 \ \tilde{e}_2] & \tilde{e}_2 \end{bmatrix}, \\ \begin{bmatrix} \tilde{e}_1 & [\tilde{e}_1 \ \tilde{e}_3] \\ \tilde{e}_3 & [\tilde{e}_3 \ \tilde{e}_1] \end{bmatrix}, \begin{bmatrix} \tilde{e}_2 & [\tilde{e}_2 \ \tilde{e}_4] \\ \tilde{e}_4 & [\tilde{e}_4 \ \tilde{e}_2] \end{bmatrix}, \\ \begin{bmatrix} \tilde{e}_3 & [\tilde{e}_1 \ \tilde{e}_3] \\ \tilde{e}_1 & [\tilde{e}_3 \ \tilde{e}_1] \end{bmatrix}, \begin{bmatrix} \tilde{e}_4 & [\tilde{e}_2 \ \tilde{e}_4] \\ \tilde{e}_2 & [\tilde{e}_4 \ \tilde{e}_2] \end{bmatrix}, \\ \begin{bmatrix} [\tilde{e}_1 \ \tilde{e}_3] & \tilde{e}_3 \\ [\tilde{e}_3 \ \tilde{e}_1] & \tilde{e}_1 \end{bmatrix}, \begin{bmatrix} [\tilde{e}_2 \ \tilde{e}_4] & \tilde{e}_4 \\ [\tilde{e}_4 \ \tilde{e}_2] & \tilde{e}_2 \end{bmatrix}, \\ \begin{bmatrix} [\tilde{e}_3 \ \tilde{e}_1] & \tilde{e}_1 \\ [\tilde{e}_1 \ \tilde{e}_3] & \tilde{e}_3 \end{bmatrix}, \begin{bmatrix} [\tilde{e}_4 \ \tilde{e}_2] & \tilde{e}_2 \\ [\tilde{e}_2 \ \tilde{e}_4] & \tilde{e}_4 \end{bmatrix} \right\}$$

Embodiment 5.2 is a design corresponding to the second level codebook $B_2$ with the rank of 3. The size C of a beam set in a block matrix $X_n$ is 4, and a same DFT beam is selected for each polarization. The block matrix $X_n$ should include orthogonal DFT beams. The number $N_2$ of the codewords in the second level codebook is 8, and 3-bit is adopted for index feedback, where the beam selection has eight options, for which 3-bit is adopted for feedback, and the phase offset information only has one option. Any codeword $W_2$ in the second level codebook $B_2$ is represented as:

$$W_2 = [a_1, a_2, a_3, a_4] \in C_2 = \left\{ \frac{1}{\sqrt{2}} \begin{bmatrix} y_1 & y_3 \\ y_2 & -y_4 \end{bmatrix} \right\}$$

$$\begin{bmatrix} y_1 & y_3 \\ y_2 & y_4 \end{bmatrix} \in \left\{ \begin{bmatrix} \tilde{e}_1 & [\tilde{e}_1 \ \tilde{e}_3] \\ \tilde{e}_1 & [\tilde{e}_1 \ \tilde{e}_3] \end{bmatrix}, \begin{bmatrix} \tilde{e}_2 & [\tilde{e}_2 \ \tilde{e}_4] \\ \tilde{e}_2 & [\tilde{e}_2 \ \tilde{e}_4] \end{bmatrix}, \\ \begin{bmatrix} \tilde{e}_3 & [\tilde{e}_1 \ \tilde{e}_3] \\ \tilde{e}_3 & [\tilde{e}_1 \ \tilde{e}_3] \end{bmatrix}, \begin{bmatrix} \tilde{e}_4 & [\tilde{e}_2 \ \tilde{e}_4] \\ \tilde{e}_4 & [\tilde{e}_2 \ \tilde{e}_4] \end{bmatrix}, \\ \begin{bmatrix} [\tilde{e}_1 \ \tilde{e}_3] & \tilde{e}_3 \\ [\tilde{e}_1 \ \tilde{e}_3] & \tilde{e}_3 \end{bmatrix}, \begin{bmatrix} [\tilde{e}_2 \ \tilde{e}_4] & \tilde{e}_4 \\ [\tilde{e}_2 \ \tilde{e}_4] & \tilde{e}_4 \end{bmatrix}, \\ \begin{bmatrix} [\tilde{e}_3 \ \tilde{e}_1] & \tilde{e}_1 \\ [\tilde{e}_3 \ \tilde{e}_1] & \tilde{e}_1 \end{bmatrix}, \begin{bmatrix} [\tilde{e}_4 \ \tilde{e}_2] & \tilde{e}_2 \\ [\tilde{e}_4 \ \tilde{e}_2] & \tilde{e}_2 \end{bmatrix} \right\}.$$

Embodiment 6.1 corresponds to the design of a second level codebook $B_2$ with the rank of 4. The size C of a beam set in a block matrix $X_n$ is 4, and a same or different DFT beam is selected independently for each polarization. The block matrix $X_n$ should include orthogonal DFT beams. The number $N_2$ of codewords in the second level codebook is 8, and 3-bit is adopted for index feedback, where the beam selection has four options, for which 2-bit is adopted for feedback, and the phase offset information has two options, for which 1-bit is adopted for feedback. Any codeword $W_2$ in the second level codebook $B_2$ is represented as:

$$W_2 = [a_1, a_2, a_3, a_4] \in C_2 = \left\{ \frac{1}{2} \begin{bmatrix} y_1 & y_1 \\ y_2 & -y_2 \end{bmatrix}, \frac{1}{2} \begin{bmatrix} y_1 & y_1 \\ jy_2 & -jy_2 \end{bmatrix} \right\}$$

$$\begin{bmatrix} y_1 \\ y_2 \end{bmatrix} \in \left\{ \begin{bmatrix} [\tilde{e}_1 \ \tilde{e}_3] \\ [\tilde{e}_1 \ \tilde{e}_3] \end{bmatrix}, \begin{bmatrix} [\tilde{e}_2 \ \tilde{e}_4] \\ [\tilde{e}_2 \ \tilde{e}_4] \end{bmatrix}, \begin{bmatrix} [\tilde{e}_1 \ \tilde{e}_3] \\ [\tilde{e}_3 \ \tilde{e}_1] \end{bmatrix}, \begin{bmatrix} [\tilde{e}_2 \ \tilde{e}_4] \\ [\tilde{e}_4 \ \tilde{e}_2] \end{bmatrix} \right\}.$$

The foregoing embodiments are all exemplary rather than limitative. The foregoing technical solutions introduce orthogonal DFT beam selection in two-level codebook index feedback, and therefore become more suitable for an MIMO application of a cross-polarized configuration of four downlink transmit antennas. Definitely, the foregoing technical solutions are also suitable for an MIMO application of a linear array configuration of transmit antennas.

A person skilled in the art shall understand that the function of any of the foregoing modules can be executed by a plurality of entity modules or functional modules, and the functions of the foregoing modules may also be integrated in one entity module or functional module for execution.

Although different embodiments of the present invention are illustrated and described, the present invention is not limited to these embodiments. Ordinal numbers such as "first" and "second" only have the effect for differentiation rather than to indicate any particular order or connection relationship between corresponding components. A technical feature that only appears in some claims or embodiments does not mean that it cannot be combined with other features in other claims or embodiments to implement a new, beneficial technical solution. Various modifications, changes, variations, replacements, and equivalents are obvious to a person skilled in the art without departing from the spirit and scope of the present invention as described in the claims.

We claim:

1. A method of feedback for a 4-antenna downlink channel in a Multiple Input Multiple Output (MIMO) system, comprising:
   detecting a downlink multiple-antenna channel;
   determining a first codeword in a first level codebook corresponding to the rank of R according to a long-term broadband channel characteristic estimated from a result of the detection, wherein any codeword in the first level codebook is a diagonal matrix, two same 2×C block matrices exist on a diagonal line, and C column vectors of the 2×C block matrix are selected from $Q_1$ discrete Fourier transform (DFT) beam vectors;
   feeding back an index of the first codeword;
   determining a second codeword in a second level codebook corresponding to the rank of R according to a short-term channel characteristic estimated from the result of the detection and the first codeword, wherein any codeword in the second level codebook is a 2C×R matrix, and each column of the 2C×R matrix is formed of one C×1 beam selection vector and one C×1 beam selection vector comprising phase offset information; and
   feeding back an index of the second codeword; and
   wherein:
      corresponding to the rank of 1, a column vector of any codeword in the second level codebook is configured to select a different DFT beam independently for each polarization; or
      corresponding to a rank of 2, a column vector of any codeword in the second level codebook is configured to select a different DFT beam independently for each polarization and to select a same DFT beam for each layer, or configured to select a different DFT beam independently for each polarization and select a same or different DFT beam for each layer independently.

2. An apparatus of feedback for a 4-antenna downlink channel in a Multiple Input Multiple Output (MIMO) system, comprising:
   a detection module, configured to detect a downlink multiple-antenna channel;
   a first determination module, configured to determine a first codeword in a first level codebook corresponding to the rank of R according to a long-term broadband channel characteristic estimated from a result of the detection, wherein any codeword in the first level codebook is a diagonal matrix, two same 2×C block matrices exist on a diagonal line, and C column vectors of the 2×C block matrix are selected from $Q_1$ discrete Fourier transform (DFT) beam vectors;
   a feedback module, configured to feed back an index of the first codeword;
   a second determination module, configured to determine a second codeword in a second level codebook corresponding to the rank of R according to a short-term channel characteristic estimated from the result of the detection and the first codeword, wherein any codeword in the second level codebook is a 2C×R matrix, and each column of the 2C×R matrix is formed of one C×1 beam selection vector and one C×1 beam selection vector comprising phase offset information; wherein
   the feedback module is further configured to feed back an index of the second codeword; and
   wherein:
      corresponding to the rank of 1, a column vector of any codeword in the second level codebook is configured to select a different DFT beam independently for each polarization; or
      corresponding to the rank of 2, a column vector of an codeword in the second level codebook is configured to select a different DFT beam independently for each polarization and select a same DFT beam for each layer, or configured to select a different DFT beam independently.

3. The apparatus according to claim 2, wherein a column vector of a codeword in the first level codebook comprises DFT beam vectors with an equal stride and DFT beam vectors orthogonal to each other, or comprises DFT beam vectors with an equal stride but no DFT beam vectors orthogonal to each other.

4. The apparatus according to claim 2, wherein corresponding to the rank of 1, a column vector of any codeword in the second level codebook is configured to select a same DFT beam for each polarization.

5. The apparatus according to claim 2, wherein corresponding to the rank of 2, a column vector of any codeword in the second level codebook is configured to select a same or different DFT beam for each layer independently and select a same DFT beam for each polarization, or configured to select a same DFT beam for each polarization and select a same DFT beam for each layer.

6. The apparatus according to claim 2, wherein a first level codebook corresponding to the rank of 3 or 4 is a proper subset of a first level codebook corresponding to the rank of 1 or 2.

7. The apparatus according to claim 2, wherein corresponding to the rank of 3 or 4, a column vector of the 2×C block matrix comprises DFT beam vectors orthogonal to each other, and a column vector of any codeword in the second level codebook is configured to select a same or different DFT beam independently for each polarization, or configured to select a same DFT beam for each polarization.

8. A user equipment, comprising the apparatus of claim 2.

9. A method for use in a base station having 4 transmit antennas in a Multiple Input Multiple Output (MIMO) system, comprising:
   receiving a rank of downlink transmission, an index of a first codeword in a first level codebook, and an index of a second codeword in a second level codebook fed back by a user equipment, wherein any codeword in the first level codebook is a diagonal matrix, two same 2×C block matrices exist on a diagonal line, C column vectors of the 2×C block matrix are selected from $Q_1$ discrete Fourier transform (DFT) beam vectors, any codeword in the second level codebook is a 2C×R matrix, and each column of the 2C×R matrix is formed of one C×1 beam selection vector and one C×1 beam selection vector comprising phase offset information; and
   determining a downlink channel characteristic according to the rank, the index of the first codeword, and the index of the second codeword; and
   wherein:
      corresponding to the rank of 1, a column vector of any codeword in the second level codebook is configured to select a different DFT beam independently for each polarization; or
      corresponding to the rank of 2, a column vector of any codeword in the second level codebook is configured to select a different DFT beam independently for each polarization and select a same DFT beam for each layer, or configured to select a different DFT beam independently for each polarization and select a same or different DFT beam for each layer independently.

10. An apparatus for use in a base station having 4 transmit antennas in a Multiple Input Multiple Output (MIMO) system, comprising:
   a receiving module, configured to receive a rank of downlink transmission, an index of a first codeword in a first level codebook, and an index of a second codeword in a second level codebook fed back by a user equipment, wherein any codeword in the first level codebook is a diagonal matrix, two same 2×C block matrices exist on a diagonal line, C column vectors of the 2×C block matrix are selected from $Q_1$ discrete Fourier transform (DFT) beam vectors, any codeword in the second level codebook is a 2C×R matrix, and each column of the 2C×R matrix is formed of one C×1 beam selection vector and one C×1 beam selection vector comprising phase offset information; and
   a channel characteristic determination module, configured to determine a downlink channel characteristic according to the rank, the index of the first codeword, and the index of the second codeword; and
   wherein:
      corresponding to the rank of 1, a column vector of any codeword in the second level codebook is configured to select a different DFT beam independently for each polarization; or
      corresponding to the rank of 2, a column vector of any codeword in the second level codebook is configured to select a different DFT beam independently for each polarization and select a same DFT beam for each layer, or configured to select a different DFT beam independently for each polarization and select a same or different DFT beam for each layer independently.

11. The apparatus according to claim 10, wherein a column vector of a codeword in the first level codebook comprises DFT beam vectors with an equal stride and DFT beam vectors orthogonal to each other, or comprises DFT beam vectors with an equal stride but no DFT beam vectors orthogonal to each other.

12. The apparatus according to claim 10, wherein corresponding to the rank of 1, a column vector of any codeword in the second level codebook is configured to select a same or different DFT beam independently for each polarization, or configured to select a same DFT beam for each polarization.

13. The apparatus according to claim 10, wherein corresponding to the rank of 2, a column vector of any codeword in the second level codebook is configured to select a same or different DFT beam independently for each polarization and select a same DFT beam for each layer, or configured to select a same or different DFT beam for each layer independently and select a same DFT beam for each polarization, or configured to select a same or different DFT beam independently for each polarization and select a same or different DFT beam for each layer independently, or configured to select a same DFT beam for each polarization and select a same DFT beam for each layer.

14. The apparatus according to claim 10, wherein a first level codebook corresponding to the rank of 3 or 4 is a proper subset of a first level codebook corresponding to the rank of 1 or 2.

15. The apparatus according to claim 10, wherein the apparatus comprises the base station equipment.

* * * * *